US006856607B1

(12) United States Patent
Vialle et al.

(10) Patent No.: US 6,856,607 B1
(45) Date of Patent: Feb. 15, 2005

(54) SYSTEM AND METHOD FOR DETECTING VALID INDICATOR SIGNALS

(75) Inventors: Jerome Vialle, Nice (FR); Patrick Ryan, Yorba Linda, CA (US); Michael Whitfield, Valbonne (FR)

(73) Assignee: Conexant Systems, Inc., Newport Beach, CA (US)

( * ) Notice: Subject to any disclaimer, the term of this patent is extended or adjusted under 35 U.S.C. 154(b) by 876 days.

(21) Appl. No.: 09/817,827

(22) Filed: Mar. 26, 2001

(51) Int. Cl.[7] .............................................. H04B 7/185
(52) U.S. Cl. ...................................................... 370/318
(58) Field of Search ................................. 370/241, 245, 370/247, 248, 251, 252, 480, 319, 311, 333, 332, 334, 344, 350, 318, 317, 401, 351, 352, 465; 455/427, 428, 452.2, 10, 9, 23, 24

(56) References Cited

U.S. PATENT DOCUMENTS 5,832,379 A * 11/1998 Mallinckrodt ................ 455/427
5,835,857 A * 11/1998 Otten .......................... 455/410

* cited by examiner

Primary Examiner—Dang Ton
(74) Attorney, Agent, or Firm—Farjami & Farjami LLP

(57) ABSTRACT

Disclosed are systems and methods for signal detection. In one embodiment, a method is provided for detecting a signal. In this respect, the method comprises the steps of determining a normalized measure of a first power within a first frequency band relative to a second power within a second frequency band of an input signal in a network gateway, wherein the first frequency band is within the second frequency band; and, comparing the normalized measure of the first power with a predefined power threshold to detect a presence of an anticipated signal in the first frequency band.

32 Claims, 6 Drawing Sheets

SYSTEM AND METHOD FOR DETECTING VALID INDICATOR SIGNALS

TECHNICAL FIELD

The present invention is generally related to the field of communications and, more particularly, is related to a system and method for detecting valid indicator signals in communications links.

BACKGROUND OF THE INVENTION

Current technology now makes it possible to transmit and receive voice signals, facsimile signals, and/or data signals over networks such as the Internet. In one example, to create a typical communications link using a network, an individual makes a local telephone call from a first telephone to a first network gateway over a local telecommunications network. The individual informs the gateway of the desired telephone number to be contacted. The first network gateway, in turn, identifies a second network gateway on the network that can contact the desired number. The first gateway then contacts the second network gateway via the network such as the Internet. The second network then contacts a second telephone via the local telecommunications network. This approach may be employed to conduct long distance calls at local telephone rates.

The network gateways typically include logical circuitry and/or software/firmware executed by a processor circuit to provide for gateway operation in the voice, facsimile, and data communications modes. Also, the network gateways may include logical circuitry and/or software/firmware executed by a processor circuit to switch the mode of operation between the voice, facsimile, and data communications modes.

For example, when a facsimile is transmitted from the first and second gateways, initially a telephone call is established between first and second facsimile machines and their respective gateways. After the telephone link is established, facsimile machines typically conduct startup negotiations using various tones, etc., to facilitate the transfer of a document. When the facsimile machines attempt to begin the startup negotiations, the respective gateways detect the tones transmitted and switch to a facsimile operating mode to facilitate the transfer of a document. The gateways then conduct the startup negotiations with their respective facsimile machines.

While this technique of establishing facsimile communication works most of the time, it is susceptible to error due to the so called "secretary problem". Assume, for example, that a voice call is established in the manner described above from a telephone in an office environment. Also assume that a facsimile is physically located within hearing distance of the individual making the telephone call. During the voice conversation, assume that the facsimile is employed to transmit a facsimile across a separate telephone line or other channel. During the course of the startup negotiations with a remote facsimile, the facsimile transmits the various tones used in the startup negotiations of the facsimile transfer. These tones may often be heard as audible tones in the office environment.

If the telephone receiver that is currently in use for the telephone conversation is close enough to the facsimile, it inevitably picks up the audible tones that are transmitted by the facsimile. These tones are then relayed to the gateways that are currently employed to facilitate the voice conversation. Unfortunately, these facsimile tones can mislead the gateways. Specifically, upon detecting these tones, the gateways are led to believe that the current voice call is to be switched into a facsimile call and they switch to facsimile operating mode accordingly. When this occurs, the telephone conversation is disrupted to the annoyance of the individuals involved in the discussion.

SUMMARY OF THE INVENTION

In view of the foregoing, the present invention provides for various systems and methods for signal detection. In one embodiment, a method is provided for detecting a signal. In this respect, the method comprises the steps of determining a normalized measure of a first power within a first frequency band relative to a second power within a second frequency band of an input signal in a network gateway, wherein the first frequency band is within the second frequency band; and, comparing the normalized measure of the first power with a predefined power threshold to detect a presence of an anticipated signal in the first frequency band.

In another embodiment, the present invention provides for a program embodied in a machine readable medium for detecting a signal. In this regard, the program comprises at least one statement for determining a normalized measure of a first power within a first frequency band relative to a second power within a second frequency band of an input signal in a network gateway, wherein the first frequency band is within the second frequency band; and, at least one statement for comparing the normalized measure of the first power with a predefined power threshold to detect a presence of an anticipated signal in the first frequency band. In addition, the logic in the program as described above may be implemented in terms of dedicated hardware or a combination of dedicated hardware and general purpose hardware/software.

In still another embodiment, the present invention provides for a system for signal detection in dedicated hardware. This system includes an automatic gain controller adapted to normalize a signal power of an input signal across a predefined frequency spectrum, and a narrowband filter coupled to the automatic gain controller, the narrowband filter being configured to isolate a predefined frequency band of the input signal, wherein an anticipated signal is transmitted in the predefined frequency band. The system also includes a power estimator coupled to the narrowband filter for estimating the power within the predefined frequency band, and a logical circuit for comparing the power estimated within the predefined frequency band with a predefined power threshold to detect a presence of the anticipated signal.

The present invention further provides for yet another system for signal detection. In this respect, the system includes a first estimator adapted to estimate a signal power of an input signal across the input signal frequency band, and a narrowband filter coupled to the first estimator, the narrowband filter being configured to isolate a predefined frequency band within the input signal frequency band, wherein an anticipated signal is transmitted in the predefined frequency band. The system also includes a second estimator adapted to estimate a second power within the predefined frequency band, and a logical circuit to compare a ratio of the second power to the signal power with a predefined ratio threshold.

The present invention provides several advantages, including an ability to detect a facsimile tone in a gateway without being susceptible to the secretary problem as discussed above. Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
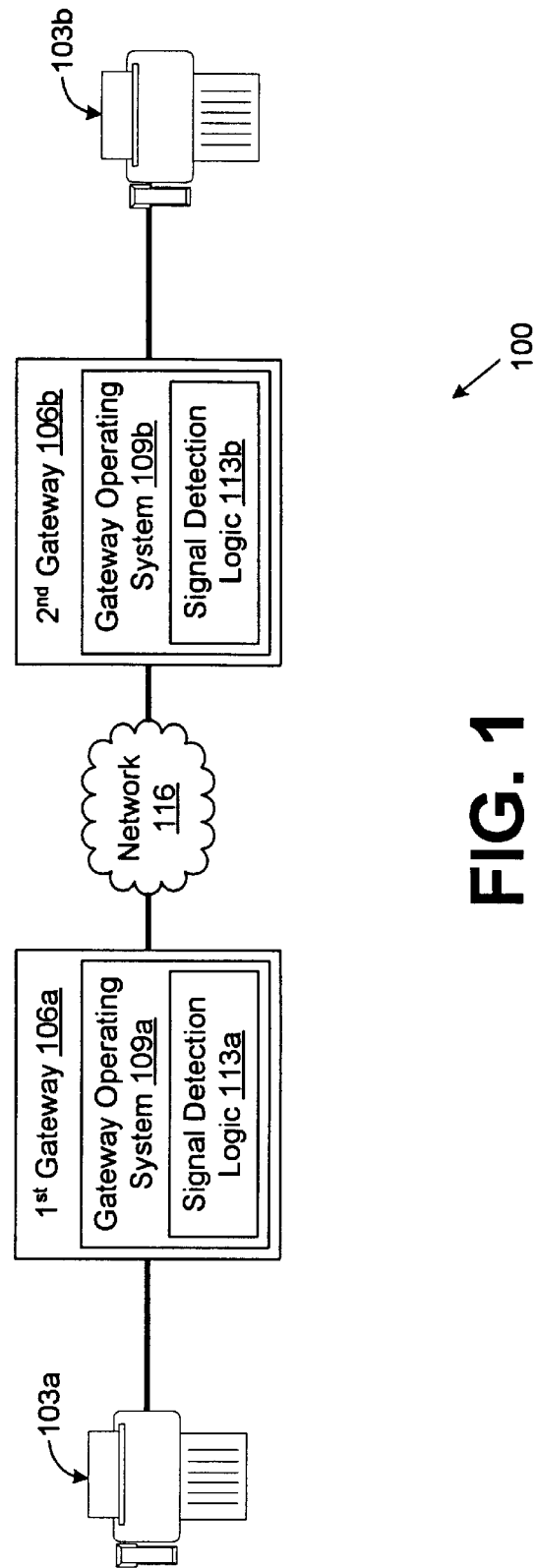
FIG. 1 is a block diagram of a facsimile transmission via a network.

With reference to FIG. 1, shown is a facsimile transmission network 100 according to an embodiment of the present invention. The facsimile transmission network 100 includes first and second facsimiles 103a and 103b. The first facsimile 103a is coupled to a first gateway 106a via a local loop, wireless link, or other communications link. The first gateway 106a is coupled to a network 116. In turn, the network 116 is coupled to a second gateway 106b that is coupled to a second facsimile 103b via a local loop, wireless link, or other communications link. The network 116 may be, for example, the Internet or other such network. The first and second gateways 106a and 106b include gateway operating systems 109a and 109b with signal detection logic 113a and 113b, respectively.

Next the operation of the facsimile transmission network 100 is described. To begin, the first facsimile 103a initiates a local telephone call to the first gateway 106a to establish a voice communications link to the second facsimile 103b. The first gateway 106a in turn initiates data communication with the second gateway 106b over the network 116. The second gateway 106b then establishes communication with the second facsimile 103b. By default, the gateway operating systems 109a and 109b assume that an initiated telephone call is to be a voice transmission. There are various approaches that may be employed to establish the communications link between the first and second facsimiles 103a and 103b that are generally known by those with ordinary skill in the art. Consequently, the details of how such a link is established are not covered herein in significant detail.

As is typical, the transmission of voice signals across the network 116 may involve speech compression techniques. For facsimile transmission, such compression techniques may result in a loss of data information that seriously alters the message content. Consequently, for successful facsimile transmission, the gateways 106a and 106b should eliminate all speech compression and any other voice transmission enhancements.

With this in mind, after the first facsimile 103a initiates the voice communications link with the first gateway 106a, the first facsimile 103a may transmit periodic facsimile tones that are ultimately intended for the second facsimile 103b. Alternatively, the first facsimile 103a may silently wait for tones generated by the second facsimile 103b. These tones are generally part of a startup protocol employed by facsimiles to establish data communication over telecommunications networks as is generally known by those with ordinary skill in the art. The signal detection logic 113a and 113b continually searches for the facsimile tones as the switch to facsimile communication may occur at any time throughout the duration of a voice transmission. The signal detection logic 113a and 113b detects any facsimile tones generated by the first and second facsimiles 103a and 103b and causes the corresponding gateway operating system 109a or 109b to switch to facsimile mode to facilitate facsimile communication. Specifically, in facsimile mode all speech compression and other enhancements are switched off and any facsimile transmission enhancements are activated as is generally known by those with ordinary skill in the art.

The facsimile transmission network 100 provides a first example of the operation of the signal detection logic 113a and 113b. Specifically, in the case of the facsimile transmission network 100, the first and second facsimiles 103a and 103b are directly linked to the first and second gateways 106a and 106b without a telephone receiver as would be the case with a telephone call. Thus a minimum amount of noise other than the facsimile tones and data communication is transmitted when the initial facsimile transmission is established.

Figure 2:
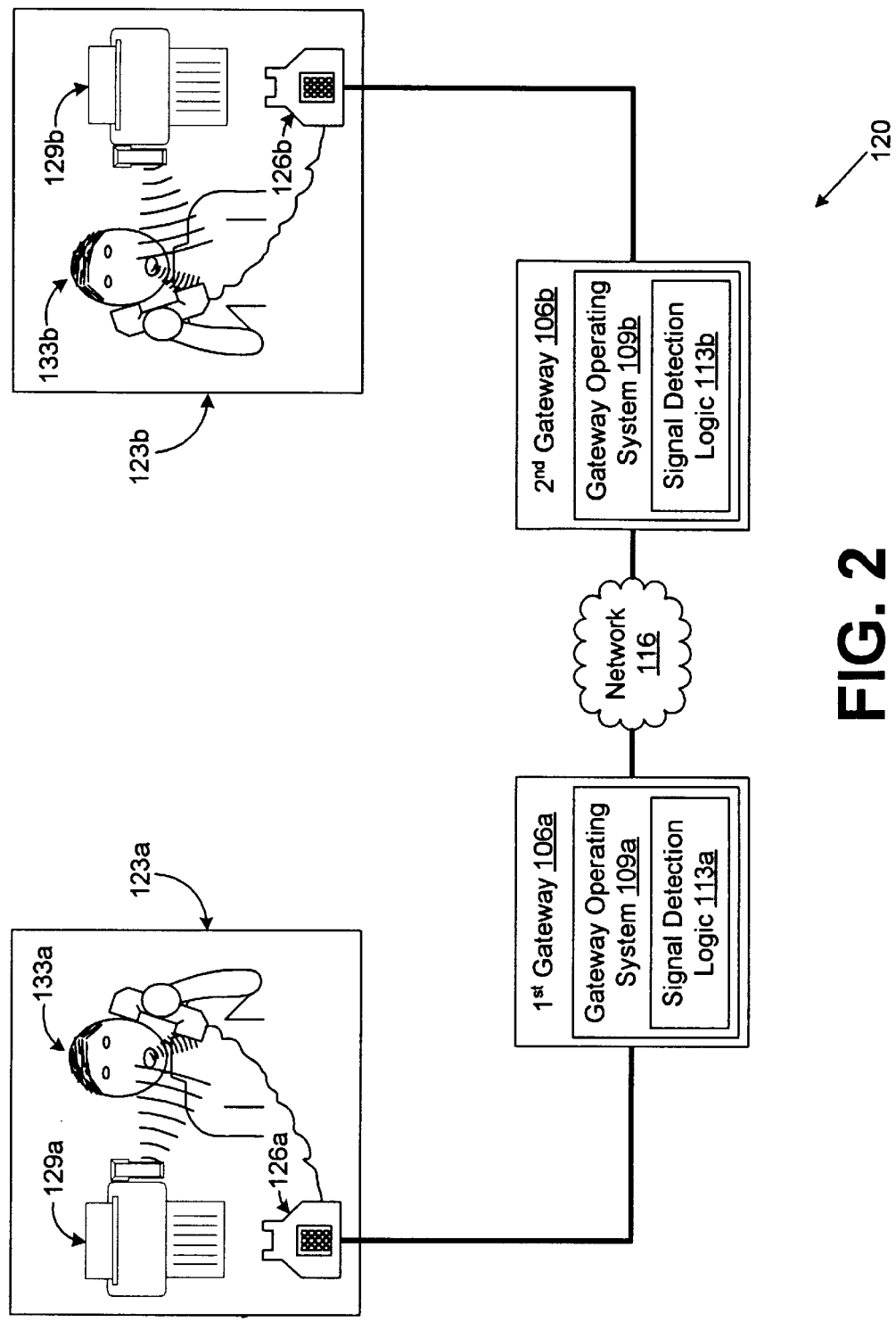
FIG. 2 is a block diagram of a voice transmission via the network of FIG. 1.

With reference to FIG. 2, shown is a voice transmission network 120 according to an aspect of the present invention. The voice transmission network 120 includes first and second locations 123a and 123b that may be, for example, an office or other location. In each of the locations 123a and 123b is a telephone 126a and 126b, respectively. Also, the first and second locations 123a and 123b include first and second facsimiles 129a and 129b, respectively. The first and second facsimiles 129a and 129b are coupled to a telecommunications network or other network (not shown) to transmit to various other remote facsimile machines as is generally known by those with ordinary skill in the art.

The voice transmission network 120 is susceptible to the secretary problem as mentioned above. The following discussion provides an illustration of how the secretary problem may arise and how the signal detection logic 113a prevents the occurrence of this problem. To begin, a first individual 133a makes a telephone call with the first telephone 126a and establishes a voice communications link to the second telephone 126b via the first and second gateways 106a and 106b, and the network 116. Assume that the individuals 133a and 133b are involved in a conversation for some period of time when one of the facsimiles 129a or 129b is employed to transmit or is contacted to receive a facsimile transmission to or from a remote facsimile (not shown). During the startup of the facsimile communication, the facsimiles 129a and 129b emit the audible tones mentioned above.

Assuming that these audible tones are within earshot of either one of the individuals 133a or 133b that is talking on the telephone 126a or 126b, respectively, then the audible tones may be picked up by one of the receivers of the telephones 126a or 126b. Once this occurs, the facsimile tones are transmitted to the gateways 106a and 106b as part of the voice communication taking place. In prior art technology, the first and second gateways 106a and 106b may have been misled by these tones and the gateway operating systems 109a and 109b would switch over to facsimile mode assuming that the voice transmission has changed to a facsimile transmission. Unfortunately, in such circumstances, any voice compression is stopped and the telephone conversation between the first and second individuals 133a and 133b may be disrupted when fax transmission enhancements are enabled by gateways 106a and 106b.

However, with regard to the voice transmission network 120, the signal detection logic 113a and 113b recognizes that the tone transmitted by either the first or second facsimiles 129a and 129b is not a tone transmitted for a facsimile transmission, but has been erroneously included within the voice transmission. As a consequence, the gateway operating systems 109a and 109b do not switch over to facsimile mode and the voice communication continues even though the first or second facsimile 129a or 129b generates multiple audible signals that are picked up by the respective telephone receivers. The following discussion describes the specific features of the signal detection logic 113a and 113b that facilitate the selective detection of the facsimile tones or other anticipated signal as described above.

Figure 3:
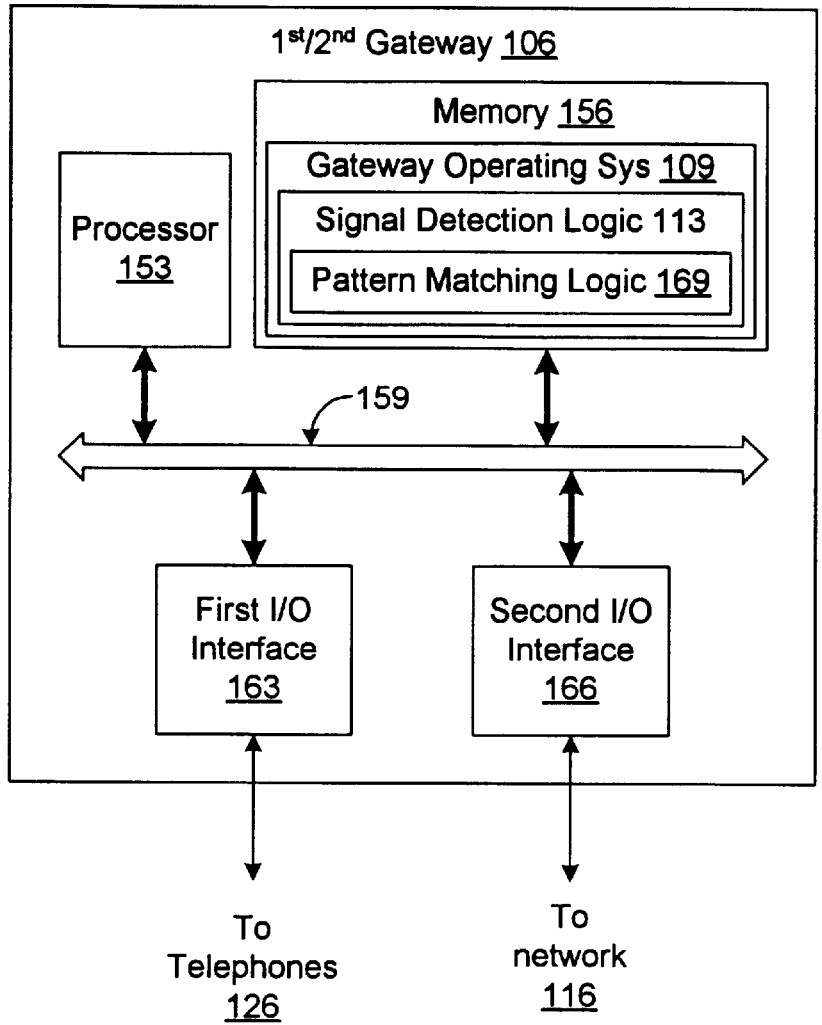
FIG. 3 is a block diagram of one embodiment of first and second gateways employed in the network of FIG. 1 according to an embodiment of the present invention.

With respect to FIG. 3, shown is one exemplary embodiment of the first and second gateways 106. According to this embodiment, the first and second gateways 106 include a digital signal processor circuit to implement the gateway operating system 109 and the signal detection logic 113 in the form of software. In addition, the signal detection logic 113 may include pattern matching logic 169, the functionality of which is discussed in later text.

Alternatively, the gateway operating system 109 and/or the signal detection logic 113 may also be embodied in dedicated hardware or a combination of software/general purpose hardware and dedicated hardware. If embodied in dedicated hardware, the gateway operating system 109 and/ or the signal detection logic 113 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

With reference to the embodiment depicted in FIG. 3, the digital signal processor of the first and second gateways 106 includes a processor 153 and a memory 156, both of which are coupled to a local interface 159. The local interface 159 may be, for example, a data bus with an accompanying control bus as is generally known by those with ordinary skill in the art. The digital signal processor circuit within the first and second gateways 106 also includes first and second input/output (I/O) interfaces 163 and 166. The first and second I/O interfaces 163 and 166 may be employed to couple the local interface 159 to one of the first or second telephones 126a or 126b (FIG. 2) by way of a local loop as is generally known by those with ordinary skill in the art.

The second I/O interface 166 may be employed to couple the local interface 159 to the network 116 as is generally known by those with ordinary skill in the art. In this manner, the processor 153 may transmit and receive voice and/or facsimile information to and from the first and second telephones 126a and 126b or to and from the network 116, accordingly.

The memory 156 may include both volatile and nonvolatile memory components. Volatile components are those that do not retain data values upon loss of power. Nonvolatile components are those that retain data upon a loss of power. Thus, the memory 156 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processor 153 may represent multiple processors and the memory 156 may represent multiple memories that operate in parallel. In such a case, the local interface 159 may be an appropriate network that facilitates communication between any two of the multiple processors or between any processor and any of the memories, etc. The local interface 159 may facilitate memory to memory communication as well. The processor 153, memory 156, and local interface 159 may be electrical or optical in nature. Also, the memory 156 may be magnetic in nature.

The functionality and/or logic of the gateway operating system 109 beyond the signal detection logic 113 facilitates the operation of the $1^{st}$ and $2^{nd}$ gateways insofar as their normal operation in establishing communications links is concerned. The gateway operating system 109 also switches between voice, facsimile, and other modes operation in response to output generated by the signal detection logic 113 as will be described.

It is important to note that the discussion of the use of the signal detection logic 113 is not restricted to the detection of facsimile tones. All discussion herein relating to the specific use of the signal detection logic 113 to detect facsimile tones merely provides an example of a use of the signal detection logic 113. One with ordinary skill in the art can appreciate that the signal detection logic 113 may be employed to detect other types of anticipated signals. Such signals are "anticipated" as their characteristics, i.e. operating frequency band and other characteristics, are known, thereby facilitating their detection.

Figure 4:
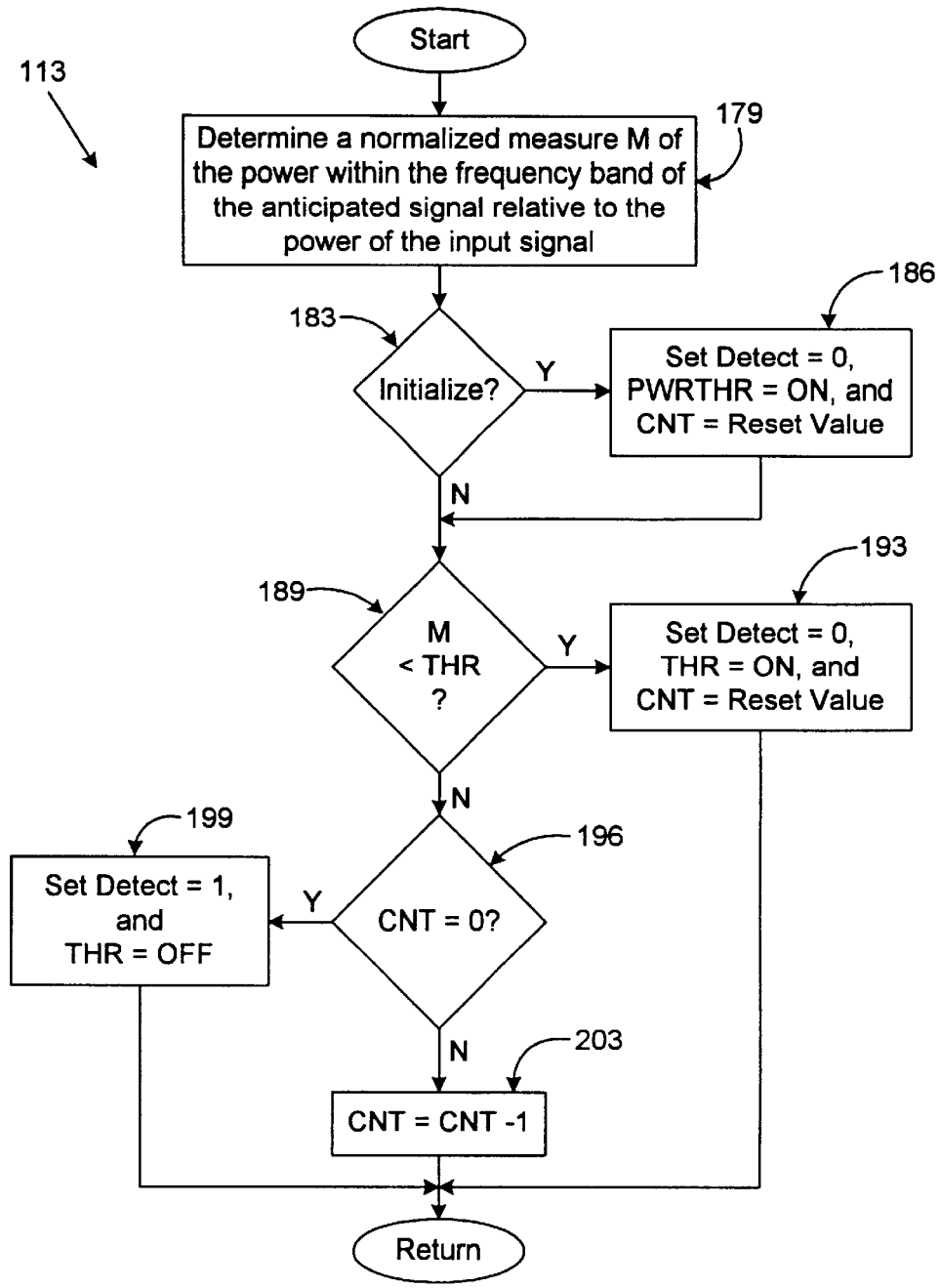
FIG. 4 is a flow chart of signal detection logic executed in the first and second gateways of FIG. 2.

With reference to FIG. 4, shown is a flow chart of the signal detection logic 113 according to an embodiment of the present invention. Alternatively, the flow chart of FIG. 4 may viewed as depicting the steps in a method for detecting a tone or other anticipated signal.

The signal detection logic 113 is advantageous in that it can discern the difference between a tone signal from a directly connected facsimile 103a (FIG. 1) or 103b (FIG. 1) and the same tone that has been transmitted by a telephone 126a (FIG. 2) or 126b (FIG. 2) due to having been picked up by a respective telephone receiver as described with reference to the voice transmission network 120 (FIG. 2). According to this embodiment, this is accomplished by obtaining a normalized measure of the power in a frequency band employed by the anticipated signal relative to the power of the entire incoming signal.

To explain further, in the case that the signal and the facsimile tone are created by the directly connected facsimiles 103a and 103b, most of the energy in the entire signal is included within the facsimile tone itself since there is little noise due to the absence of a telephone receiver that picks up other signals such as, for example, voice signals and other audible noise. In the case of the voice transmission network 120, the energy of the entire signal includes both voice signals and any other noise picked up by the receiver of the respective telephone 126a or 126b as well as the incidental facsimile tone that was picked up by the receiver.

By obtaining a normalized measure of the power in the frequency band of the facsimile tone relative to the power of the entire input signal, then an incidentally transmitted facsimile tone as in the voice communication network 120 has a much lower energy level than the directly transmitted facsimile tone of the facsimile transmission network 100. This is because, after normalization, the energy associated with the voice signal and noise picked up by the receiver of the telephones 126a and 126b robs from the energy that is transmitted in the facsimile tone itself. Consequently, the signal level of the facsimile tone in the voice transmission network 120 is much less than the energy of the facsimile tone in the facsimile transmission network 100 (FIG. 1).

With the foregoing in mind, reference is made to the signal detection logic 113 of FIG. 4. In the embodiment of FIG. 4, it is assumed that the incoming signal from the telephones 126a/126b and/or the facsimiles 103a/103b has been digitized in the first or second input/interfaces 163 and 166 (FIG. 3). Thus, the signal detection logic 113 is executed for each sample of the digitized signals that are received.

Before a description of the signal detection logic 113 if offered, a brief description of the variables maintained and employed by the signal detection logic 113 is provided for purposes of providing context for the following discussion. Such variables may be maintained, for example, in the memory 156, etc. The signal detection logic 113 determines a normalized measure M of the power within the predefined frequency band of the anticipated signal to be detected relative to the power of the entire frequency spectrum of the input signal. Also, a threshold (THR) variable defines, for example, a power threshold which, when breached by the normalized measure M, indicates that the corresponding anticipated signal has been created by a directly connected facsimile, etc. The threshold THR may be set to one of two different levels, namely, an off-to-on state threshold (ON) and an on-to-off state threshold (OFF). The signal detection logic 113 also maintains a counter variable CNT that is employed to create a time delay as is discussed below. Finally, the signal detection logic 113 maintains a detection variable (DETECT) that indicates the detection of the anticipated signal.

Resuming with the discussion of the signal detection logic 113, attention is directed to block 179 in which the normalized measure M of the power within the frequency band of the anticipated signal is ascertained relative to the power in the entire frequency spectrum of the input signal. There may be multiple ways of determining the normalized measure M, examples of which are provided in later discussion. Thereafter, in block 183 the signal detection logic 113 determines whether an initialization of variables is to be performed. Such is the case, for example, when the signal detection logic 113 is executed for the first time during a call session. Assuming that the initialization is to occur, then the signal detection logic 113 progresses to block 186. Otherwise, the signal detection logic 113 proceeds to block 189.

Assuming that the signal detection logic 103 has proceeded to block 186, an initialization function is performed in which certain variables are set to predefine values. Specifically, the detection variable DETECT is set equal to zero, the threshold THR is set to the off-to-on state threshold ON, and the counter variable CNT is set equal to a predefined reset value that provides for a predetermined time delay. From block 186, the signal detection logic 113 moves to block 189 as shown.

In block 189, it is determined whether the normalized measure M is less than the threshold THR. If so, then the signal detection logic 113 moves to block 193. Otherwise, the signal detection logic 113 moves to block 196. In block 193, the detection variable DETECT is set equal to zero, the threshold THR is reset to the off-to-on state threshold ON, and the counter variable CNT is set equal to the predefined reset value. These actions are performed, as the normalized measure M is too low to indicate that the anticipated signal, i.e. an actual signal tone, has been detected. After block 193, the signal detection logic 113 ends to await execution for the next sample of the received signal.

Assuming that the normalized measure M is greater than the threshold THR in block 189, then the signal detection logic 113 moves to block 196 in which it is determined whether the counter variable CNT is equal to zero. If so then the signal detection logic 113 moves to block 199. Otherwise the signal detection logic 113 proceeds to block 203. In block 199, given that the counter variable CNT has reached a value of zero, then the normalized measure M has been greater than the threshold THR for a predetermined period of time depending on the actual value of the predefined reset value placed in the counter variable CNT. In block 199, the detect variable is set to a logical "1" indicating that the anticipated signal or tone has been detected. The gateway 106 (FIG. 3) may then take appropriate action such as switching to facsimile mode or other action depending on the specific application and the nature of the tone or signal detected. Also, in block 199 the threshold THR is set equal to the on-to-off threshold OFF. This provides a separate threshold to determine when the anticipated signal that has been detected disappears.

After block 199 the signal detection logic 113 ends to await execution for another sample. Assuming that the counter variable CNT is not equal to zero in block 196, then the signal detection logic 113 moves to block 203 in which the counter variable CNT is decremented by a value of one. Thereafter the signal detection logic 113 ends to await execution for another sample. It should be apparent that the signal detection logic 113 incorporates a time delay of a period of time that the anticipated signal should be present before it will indicate the detection thereof. Specifically the reset value of the counter variable CNT determines how long the signal detection logic 113 has to detect the anticipated signal before it indicates such detection. This delay guards against false detection of the anticipated signal when an additional unwanted signal also appears in the frequency band in question.

The signal detection logic 113 is repeatedly executed with each sample of a signal transmitted through the gateways 106. In addition, the present invention provides for the detection of the anticipated signal within the incoming signal from the telephones 126a/126b and/or the facsimiles 103a/103b based upon its cadence over a predetermined period of time. For example, the value of the detection variable DETECT may be maintained over a period of time in a first-in-first-out (FIFO) stack. The resulting pattern stored in the FIFO stack may be compared to predetermined patterns so that the anticipated signal may be detected based upon its cadence.

Figure 5:
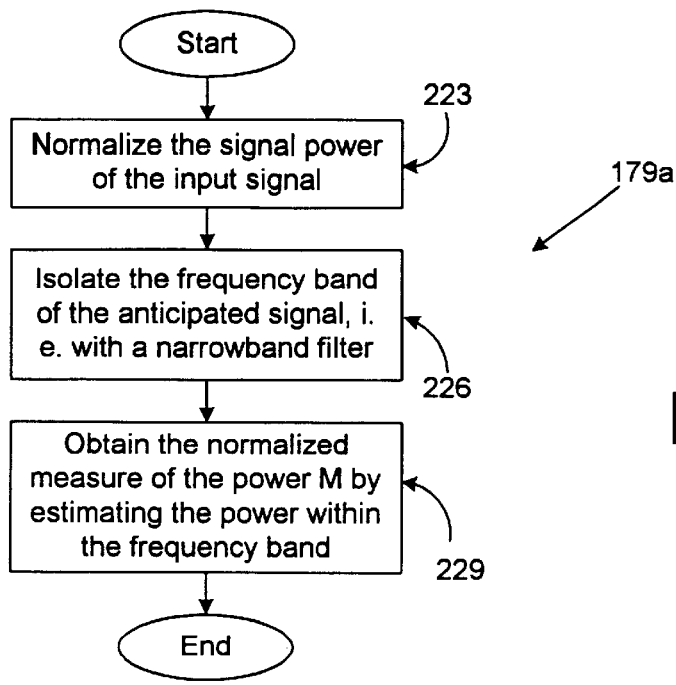
FIG. 5 is a flow chart of normalizing logic executed as a component of the signal detection logic of FIG. 4.

With reference to FIG. 5, shown is a flow chart of normalizing logic 179a which provides a first example of the logic of block 179 (FIG. 4) of the signal detection logic 113 (FIG. 4) that is executed to determine the normalized measure M as described above. Alternatively, the flow chart of FIG. 5 may be viewed as steps in a method of obtaining the normalized measure M.

Beginning with block 223, the normalizing logic 179a normalizes the signal power of the input signal across a predefined frequency spectrum. In the case of the voice/facsimile communication, for example, this frequency spectrum may be from 0 to 4 kilohertz. This may be accomplished, for example, by using an automatic gain controller or equivalent device that adjusts the level of the input signal to a predetermined threshold. The automatic gain controller may be implemented in terms of software, firmware, or dedicated hardware. Thereafter, the normalizing logic 179a moves to block 226 in which the frequency band of the anticipated signal is isolated. The anticipated signal is the tone or other signal such as, for example, a facsimile tone that is to be detected. The isolation of the frequency band of the anticipated signal may be accomplished, for example, using a narrowband filter that may be implemented in terms of software, firmware, or dedicated hardware.

The normalizing logic 179a then proceeds to block 229 in which the power within the isolated frequency band is estimated using a power estimator. The power estimator may be implemented in terms of software, firmware, or dedicated hardware. The power estimated in this frequency band is employed as the normalized measure M (FIG. 4) of the power in the frequency band in which the anticipated signal is to be detected relative to the power of the entire frequency spectrum of the input signal.

Figure 6:
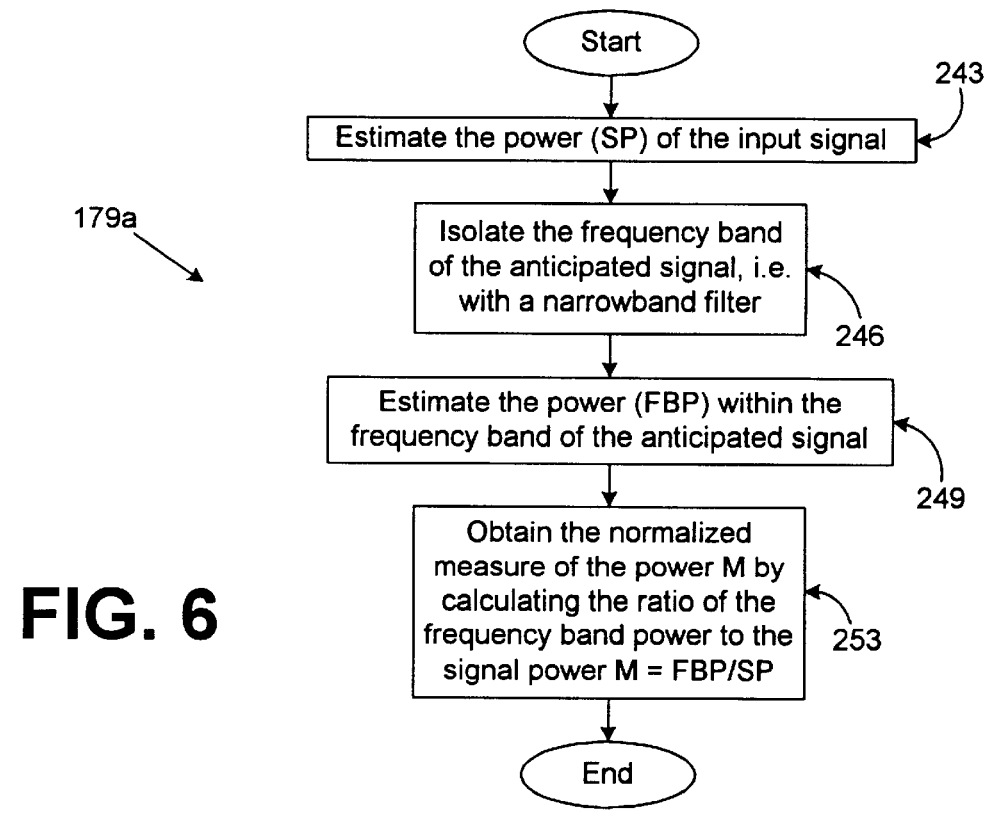
FIG. 6 is a flow chart of a second embodiment of the normalizing logic executed as a component of the signal detection logic of FIG. 4.

With reference to FIG. 6, shown is a flow chart of a second embodiment of the normalizing logic 179b according to an aspect of the present invention. Alternatively, the flow chart of FIG. 6 may viewed as depicting the steps in a method to generate the normalized measure M (FIG. 4). To facilitate the discussion of the normalizing logic 179b, several variables are defined. Specifically, these variables include an input signal power (SP) across the frequency spectrum of the input signal received from either the telephones 126a/126b and/or the facsimiles 103a/103b. Also, another variable is the frequency band power (FBP) within the frequency band in which the anticipated signal is detected.

Beginning with block 243, the normalizing logic 179b estimates the input signal power SP of the input signal. In the case of the voice/facsimile communication, for example, this frequency spectrum may be from 0 to 4 kilohertz. Thereafter, the normalizing logic 179b proceeds to block 246 in which the frequency band within which the anticipated signal is to be detected is isolated. The anticipated signal is the tone or other signal such that is to be detected. The isolation of the frequency band of the anticipated signal may be accomplished, for example, using a narrowband filter that may be implemented in terms of software, firmware, or dedicated hardware.

The signal detection logic 113 then proceeds to block 249 in which the frequency band power FBP is estimated using a power estimator. The power estimator may be implemented in terms of software, firmware, or dedicated hardware. Thereafter, in block 253 the ratio of the frequency band power FBP to the signal power SP is computed to obtain the ratio FBP/SP. The ratio FBP/SP is then employed as the normalized measure M.

Figure 7:
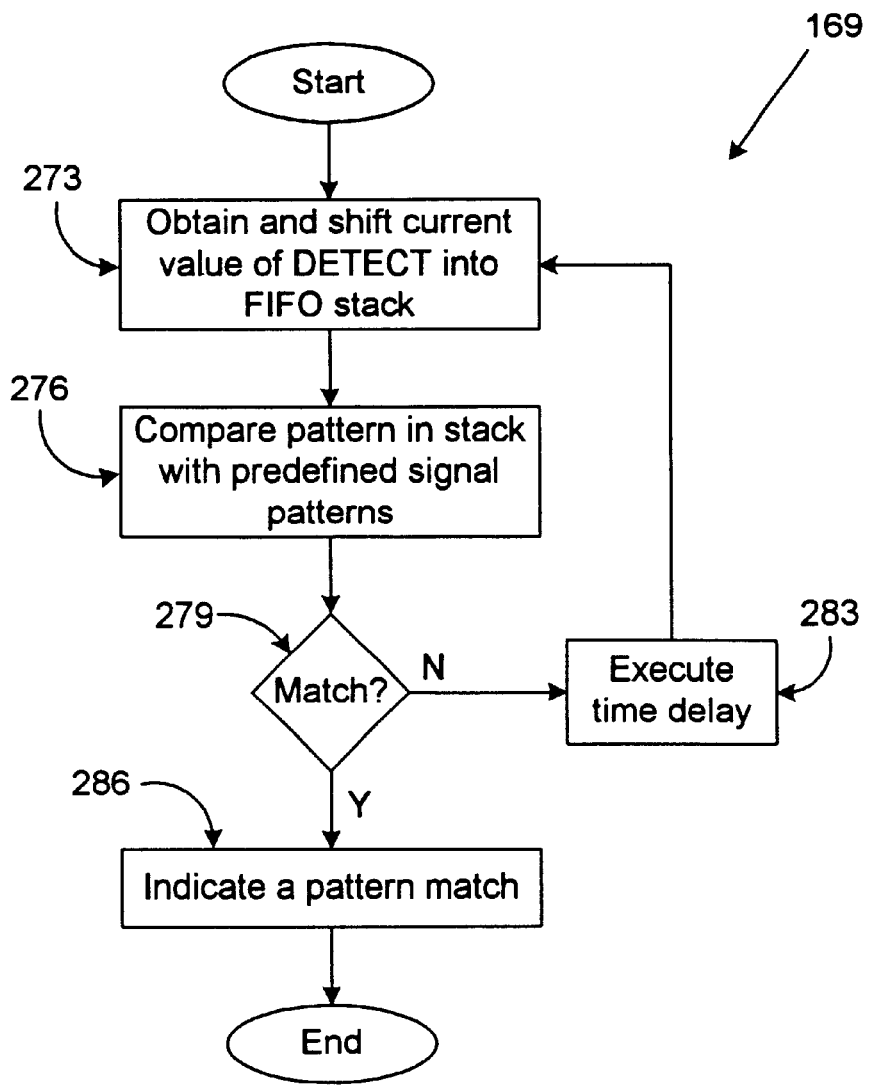
FIG. 7 is a flow chart of pattern matching logic executed in the first and second gateways of FIG. 2.

With reference to FIG. 7, shown is a flow chart of the pattern matching logic 169 that may be implemented in conjunction with the signal detection logic 113 (FIGS. 4–6) to detect various patterns in the anticipated signal. Alternatively, the flow chart of FIG. 7 may be viewed as depicting steps in a method executed in the first and second gateways to detect a pattern in the anticipated signal. To begin, in block 273, the current value of the detection variable DETECT is obtained and stored in the FIFO stack. The FIFO stack may be a stack maintained, for example, in the memory 156 (FIG. 3). Thereafter, in block 276 the pattern matching logic 169 compares the current pattern stored in the stack with one or more patterns stored in the memory 156 to determine if there is a match. The stored patterns indicate a cadence of a signal that is to be detected. In block 279, if a match is identified, then the pattern matching logic 169 proceeds to block 286 in which the existence of a pattern match is indicated. This may be accomplished, for example, by setting the state of a predetermined register in the memory 156 or in some other manner. Thereafter, the pattern matching logic 169 ends.

Referring back to block 279, assuming no match is found, then the pattern matching logic 169 proceeds to block 283 in which a predetermined time delay is executed. The predetermined time delay essentially sets a sample period of the pattern matching logic 169. Thereafter, the pattern matching logic 169 reverts back to block 273.

The flow charts of FIGS. 4–7 show the architecture, functionality, and operation of an implementation of both the signal detection and pattern matching logic 113 and 169. If embodied in software, each block may represent a module, segment, or portion of code that comprises one or more action statements in the form of executable instructions or declarations to implement the specified logical function(s). If embodied in hardware, each block may represent a circuit or a number of interconnected circuits to implement the specified logical function(s). Although the flow charts of FIGS. 4–7 show a specific order of execution, it is understood that the order of execution may differ from that which is depicted. For example, the order of execution of two or more blocks may be scrambled relative to the order shown. Also, two or more blocks shown in succession in FIGS. 4–7 may be executed concurrently or with partial concurrence. It is understood that all such variations are within the scope of the present invention. Also, the flow charts of FIGS. 4–7 are relatively self-explanatory and are understood by those with ordinary skill in the art to the extent that software and/or hardware can be created by one with ordinary skill in the art to carry out the various logical functions as described herein.

Also, both the signal detection and pattern matching logic 113 and 169 can be embodied in any computer-readable medium for use by or in connection with an instruction execution system such as a computer/processor based system or other system that can fetch or obtain the logic from the computer-readable medium and execute the action statements including instructions contained therein. In the context of this document, a "computer-readable medium" can be any medium that can contain, store, or maintain the signal detection and pattern matching logic 113 and 169 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A signal detection method, comprising:

determining a normalized measure of a first power within a first frequency band relative to a second power within a second frequency band of an input signal in a network gateway, wherein the first frequency band is within the second frequency band;

comparing the normalized measure of the first power with a predefined power threshold to detect a presence of an anticipated signal in the first frequency band; and indicating a detection of the anticipated signal after the normalized measure of the first power is at least as great as the predefined power threshold for a period of time.

2. The signal detection method of claim 1, wherein the step of determining the normalized measure of the first power within the first frequency band relative to the second power within the second frequency band of the input signal in the network gateway further comprises:

normalizing the second power of the input signal across the second frequency band, thereby generating a normalized input signal;

isolating the first frequency band from the normalized input signal; and estimating the first power within the first frequency band, thereby obtaining the normalized measure of the first power.

3. The signal detection method of claim 2, wherein the step of normalizing the second power of the input signal across the second frequency band, further comprises:

applying the input signal to an automatic gain controller; and adjusting a gain of the automatic gain controller to maintain the second power at an approximate constant level.

4. The signal detection method of claim 2, wherein the step of isolating the first frequency band from the normalized input signal further comprises processing the normalized input signal with a narrowband filter.

5. The signal detection method of claim 2, further comprising recording a pattern in the anticipated signal over a period of time.

6. The signal detection method of claim 5, further comprising:

comparing the pattern in the anticipated signal with at least one predefined pattern to find a match therebetween; and triggering an execution of an action upon an occurrence of the match.

7. The signal detection method of claim 1, wherein the step of determining the normalized measure of the first power within the first frequency band relative to the second power within the second frequency band of the input signal in the network gateway further comprises:

estimating the second power of the input signal across the second frequency band;

isolating the first frequency band from the input signal;

estimating the first power within the first frequency band; and calculating the normalized measure of the first power as a ratio between the first power and the second power.

8. The signal detection method of claim 7, wherein the step of isolating the first frequency band from the input signal further comprises processing the input signal with a narrowband filter.

9. The signal detection method of claim 7, further comprising recording a pattern in the anticipated signal over a period of time.

10. The signal detection method of claim 9, further comprising:

comparing the pattern in the anticipated signal with at least one predefined pattern to find a match therebetween; and triggering an execution of an action upon an occurrence of the match.

11. A program embodied in a machine readable medium, the program comprising:

at least one statement for determining a normalized measure of a first power within a first frequency band relative to a second power within a second frequency band of an input signal in a network gateway, wherein the first frequency band is within the second frequency band;

at least one statement for comparing the normalized measure of the first power with a predefined power threshold to detect a presence of an anticipated signal in the first frequency band; and at least one statement for indicating a detection of the anticipated signal after the normalized measure of the first power is at least as great as the predefined power threshold for a period of time.

12. The program embodied in a machine readable medium of claim 11, wherein the at least one statement for determining the normalized measure of the first power within the first frequency band relative to the second power within the second frequency band of the input signal in the network gateway further comprises:

at least one statement for normalizing the second power of the input signal across the second frequency band, thereby generating a normalized input signal;

at least one statement for isolating the first frequency band from the normalized input signal; and at least one statement for estimating the first power within the first frequency band, thereby obtaining the normalized measure of the first power.

13. The program embodied in a machine readable medium of claim 12, wherein the at least one statement for normalizing the second power of the input signal across the second frequency band, further comprises:

at least one statement for applying the input signal to an automatic gain controller; and at least one statement for adjusting a gain of the automatic gain controller to maintain the second power at an approximate constant level.

14. The program embodied in a machine readable medium of claim 12, wherein the at least one statement for isolating the first frequency band from the normalized input signal further comprises at least one statement for processing the normalized input signal with a narrowband filter.

15. The program embodied in a machine readable medium of claim 12, further comprising at least one statement for recording a pattern in the anticipated signal over a period of time.

16. The program embodied in a machine readable medium of claim 15, further comprising:
- at least one statement for comparing the pattern in the anticipated signal with at least one predefined pattern to find a match therebetween; and
- at least one statement for triggering an execution of an action upon an occurrence of the match.

17. The program embodied in a machine readable medium of claim 11, wherein the at least one statement for determining the normalized measure of the first power within the first frequency band relative to the second power within the second frequency band of the input signal in the network gateway further comprises:
- at least one statement for estimating the second power of the input signal across the second frequency band;
- at least one statement for isolating the first frequency band from the input signal;
- at least one statement for estimating the first power within the first frequency band; and
- at least one statement for calculating the normalized measure of the first power as a ratio between the first power and the second power.

18. The program embodied in a machine readable medium of claim 17, wherein the at least one statement for isolating the first frequency band from the input signal further comprises a narrowband filter.

19. The program embodied in a machine readable medium of claim 17, further comprising at least one statement for recording a pattern in the anticipated signal over a period of time.

20. The program embodied in a machine readable medium of claim 19, further comprising:
- at least one statement for comparing the pattern in the anticipated signal with at least one predefined pattern to find a match therebetween; and
- at least one statement for triggering an execution of an action upon an occurrence of the match.

21. A system for signal detection, comprising:
- means for determining a normalized measure of a first power within a first frequency band relative to a second power within a second frequency band of an input signal in a network gateway, wherein the first frequency band is within the second frequency band;
- means for comparing the normalized measure of the first power with a predefined power threshold to detect a presence of an anticipated signal in the first frequency band; and
- means for indicating a detection of the anticipated signal after the normalized measure of the first power is at least as great as the predefined power threshold for a period of time.

22. The system of claim 21, wherein the means for determining the normalized measure of the first power within the first frequency band relative to the second power within the second frequency band of the input signal in the network gateway further comprises:
- means for normalizing the second power of the input signal across the second frequency band, thereby generating a normalized input signal;
- means for isolating the first frequency band from the normalized input signal; and
- means for estimating the first power within the first frequency band, thereby obtaining the normalized measure of the first power.

23. The system of claim 22, wherein the means for normalizing the second power of the input signal across the second frequency band, further comprises:
- means for applying the input signal to an automatic gain controller; and
- means for adjusting a gain of the automatic gain controller to maintain the second power at an approximate constant level.

24. The system of claim 22, wherein the means for isolating the first frequency band from the normalized input signal further comprises means for processing the normalized input signal with a narrowband filter.

25. The system of claim 22, further comprising means for recording a pattern in the anticipated signal over a period of time.

26. The system of claim 25, further comprising:
- means for comparing the pattern in the anticipated signal with at least one predefined pattern to find a match therebetween; and
- means for triggering an execution of an action upon an occurrence of the match.

27. The system of claim 21, wherein the means for determining the normalized measure of the first power within the first frequency band relative to the second power within the second frequency band of the input signal in the network gateway further comprises:
- means for estimating the second power of the input signal across the second frequency band;
- means for isolating the first frequency band from the input signal;
- means for estimating the first power within the first frequency band; and
- means for calculating the normalized measure of the first power as a ratio between the first power and the second power.

28. The system of claim 27, wherein the means for isolating the first frequency band from the input signal further comprises a narrowband filter.

29. The system of claim 27, further comprising means for recording a pattern in the anticipated signal over a period of time.

30. The system of claim 29, further comprising:
- means for comparing the pattern in the anticipated signal with at least one predefined pattern to find a match therebetween; and
- means for triggering an execution of an action upon an occurrence of the match.

31. A system for signal detection, comprising:
- an automatic gain controller adapted to normalize a signal power of an input signal across a predefined frequency spectrum;
- a narrowband filter coupled to the automatic gain controller, the narrowband filter being configured to isolate a predefined frequency band of the input signal, wherein an anticipated signal is transmitted in the predefined frequency band;
- a power estimator coupled to the narrowband filter for estimating the power within the predefined frequency band; and
- a first logical circuit for comparing the power estimated within the predefined frequency band with a predefined power threshold to detect a presence of the anticipated signal; and
- a second logical circuit for indicating a detection of the anticipated signal after the power estimated within the predefined frequency band is at least as great as the predefined power threshold for a period of time.

32. A system for signal detection, comprising:
- a first estimator adapted to estimate a signal power of an input signal across an input signal frequency band;
- a narrowband filter coupled to the first estimator, the narrowband filter being configured to isolate a predefined frequency band within the input signal frequency band, wherein an anticipated signal is transmitted in the predefined frequency band;
- a second estimator adapted to estimate a second power within the predefined frequency band;
- a first logical circuit to compare a ratio of the second power to the signal power with a predefined ratio threshold; and
- a second logical circuit for indicating a detection of the anticipated signal after the ratio is at least as great as the predefined ratio threshold for a period of time.

* * * * *